United States Patent Office 2,913,130
Patented Nov. 17, 1959

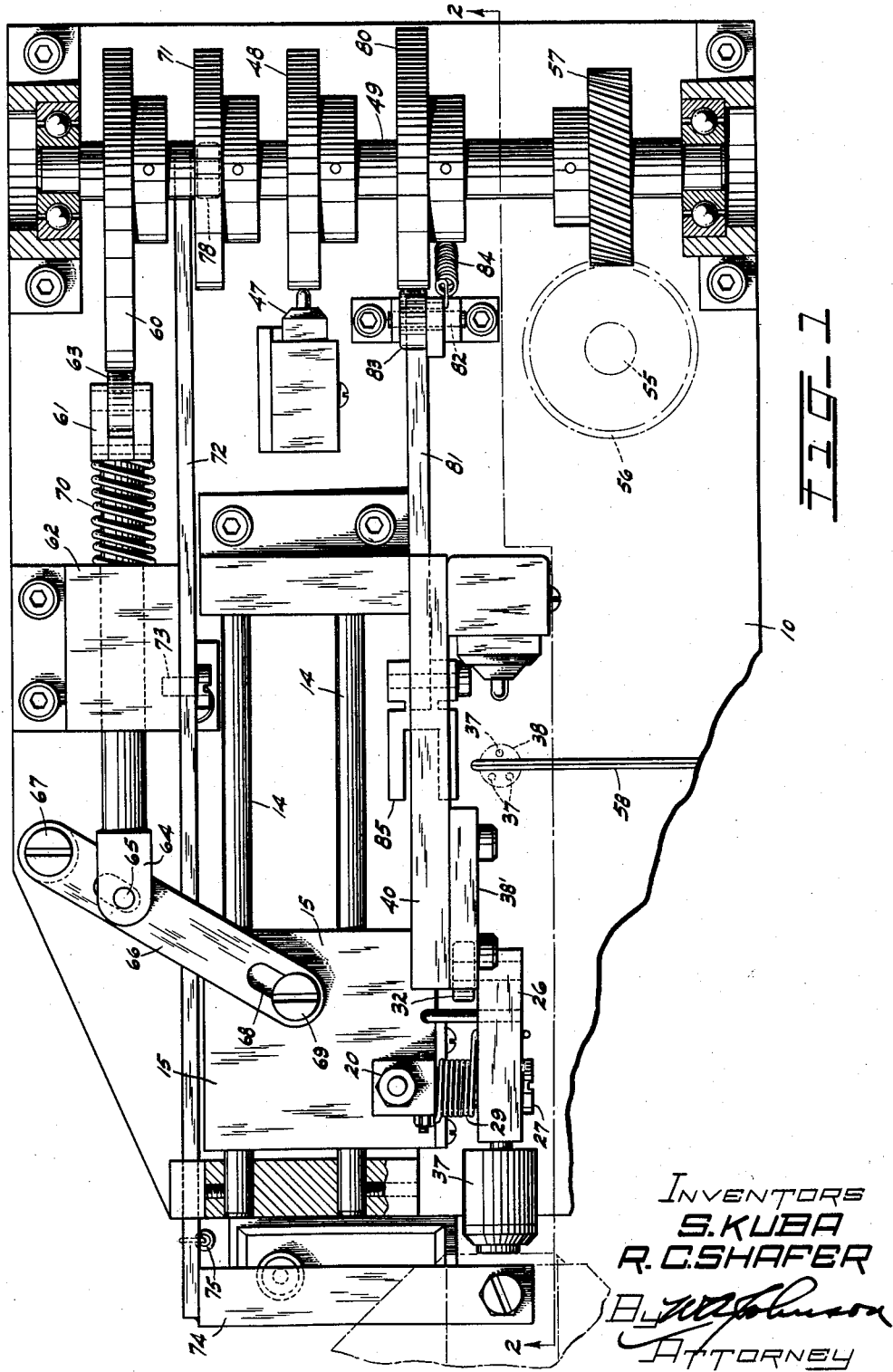

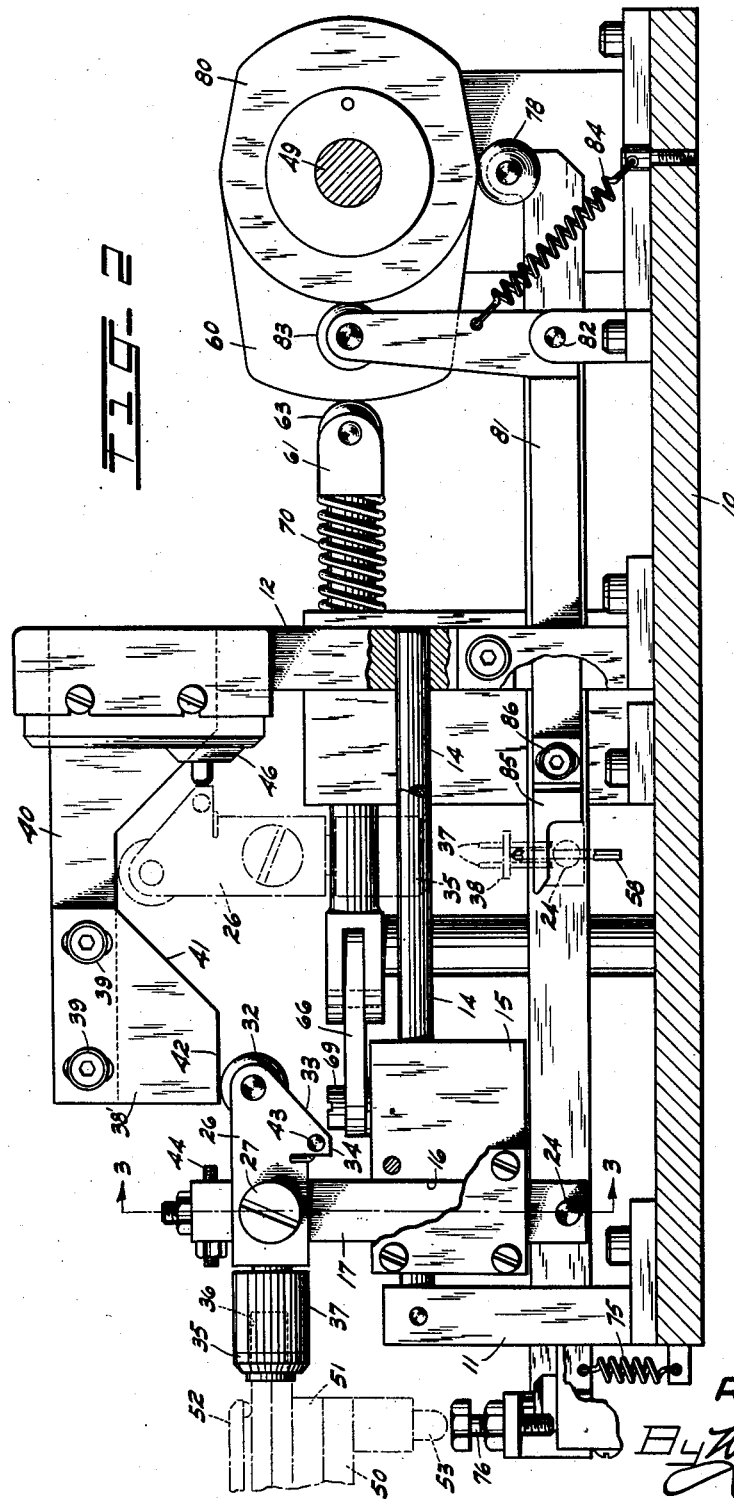

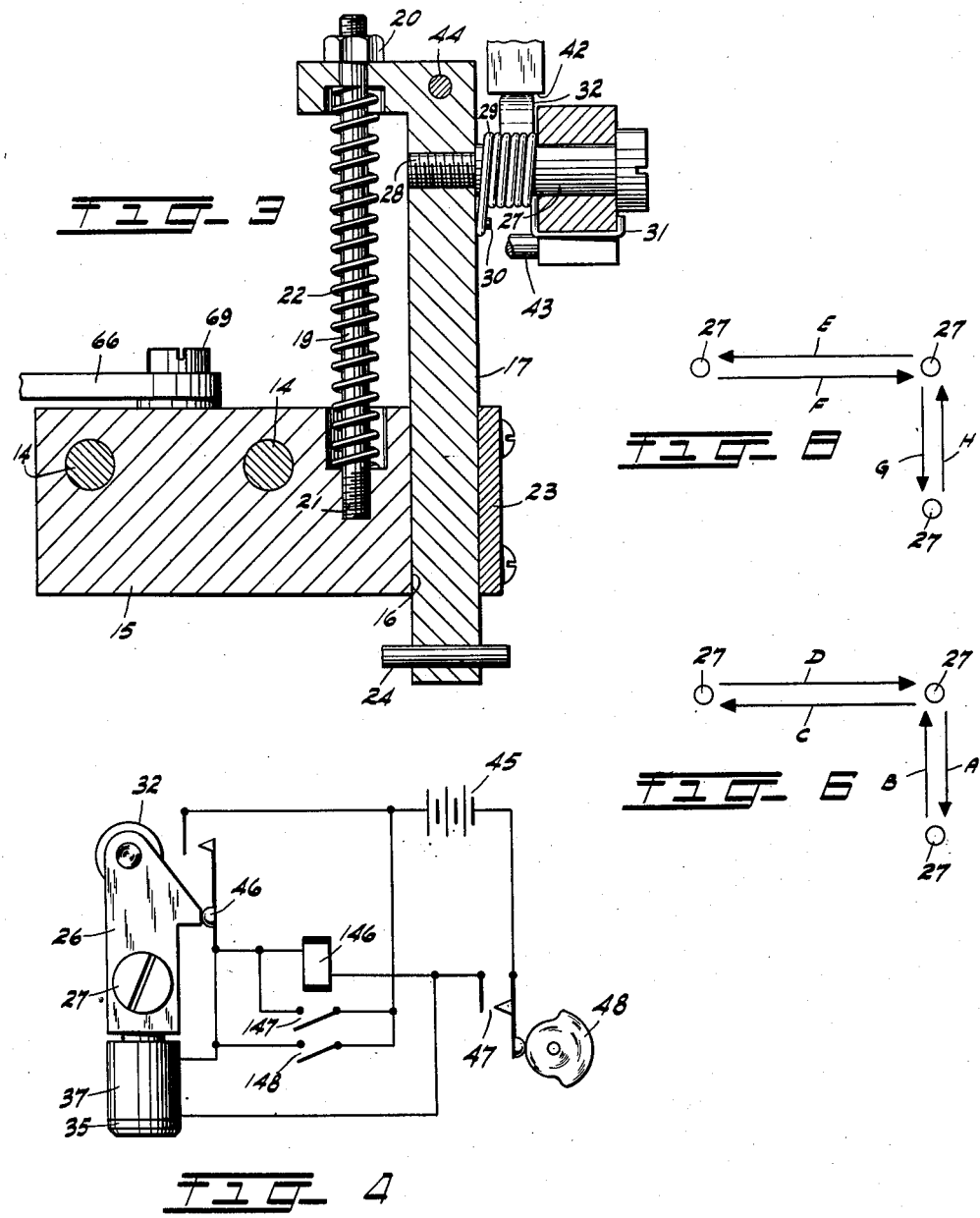

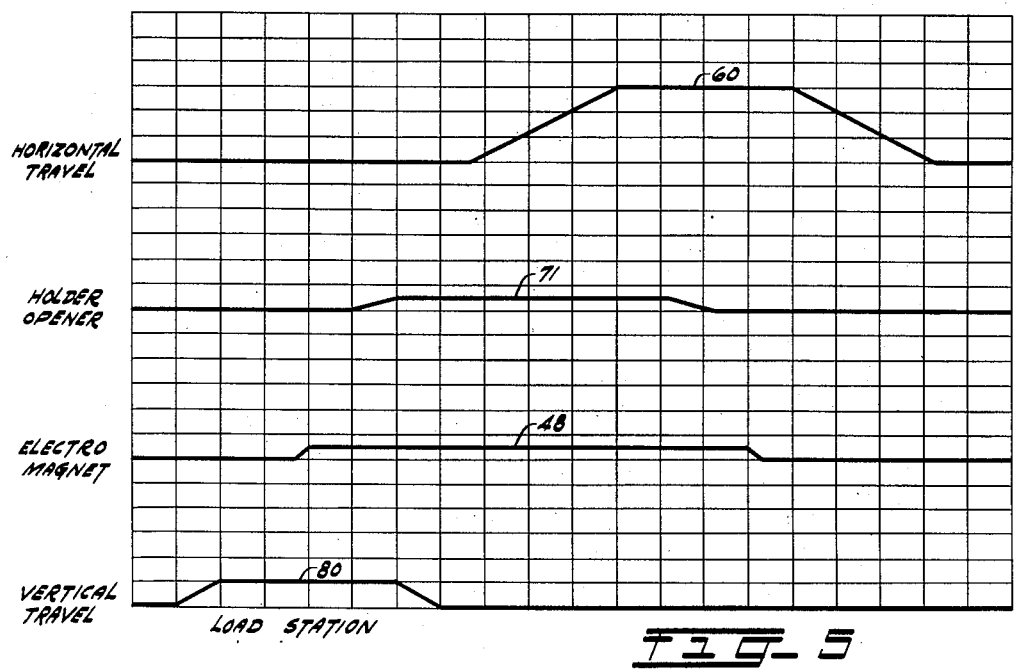
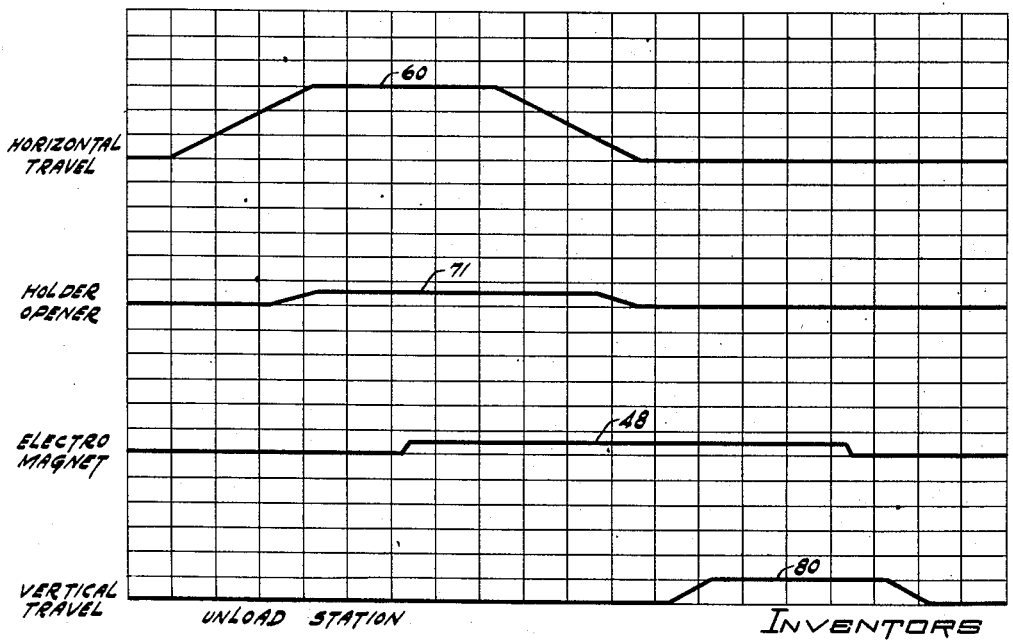

2,913,130
ARTICLE LOADING AND UNLOADING APPARATUS

Samuel Kuba, Allentown, and Richard C. Shafer, Emmaus, Pa., assignors to Western Electric Company, Incorporated, New York, N.Y., a corporation of New York Application July 11, 1958, Serial No. 748,007

7 Claims. (Cl. 214—1)

This invention relates to apparatus for transporting articles particularly for transporting articles from one holder to another.

In certain machines for assembling articles or for mounting parts on articles, the articles must be fed to holders which position the articles for receiving the parts and after the article is completed, with the one or more parts added thereto, it must be removed from the holder and positioned for removal from the machine. If these steps are performed by manual handling, the articles are sometimes inaccurately positioned in the holders and they may be damaged in various ways such as by bending projecting leads on which parts are to be mounted. It is therefore advantageous, not only in loading articles in a processing machine but also in removing articles from the machine, to accomplish these actions automatically as in transporting articles from one holder to another.

The object of the present invention is an apparatus which, though simple in structure, is highly efficient in transporting an article from one holder to another.

In accordance with the object of the invention holders, for successive articles, are disposed in planes disposed at angles with respect to each other and a chuck is supported for movement with and relative to a carriage into positions relative to the planes to receive an article from one of the holders and transport it to the other holder.

More specifically, the apparatus is substantially identical in structure for accomplishing two different purposes when mounted at a loading or an unloading station. At the loading station, the apparatus is adapted to remove articles from a holder in a form of a track angled toward a feeding position into which the articles will move successively and from which they will be removed singly by a chuck which is of an electromagnetic type energized to pick up a leading article from the track-like holder and transfer it to the gripping jaws of the other holder. The gripping jaws are a part of a turret intermittently actuated to successively position the gripping jaws first, at the loading station, and then at an unloading station.

The only changes in the apparatus when mounted at the unloading station from that employed at the loading station are embodied in the positions of certain of the cams to bring about action of the chuck to remove the finished articles from the grippers of the clamp-like holder and return them to a track-like holder angled away from the machine.

Other objects and advantages will be apparent from the following detailed description when considered in conjunction with the accompanying drawings wherein:

Fig. 1 is a top plan view of the apparatus;

Fig. 2 is a vertical sectional view taken along the line 2—2 of Fig. 1;

Fig. 3 is an enlarged vertical sectional view taken along the line 3—3 of Fig. 2;

Fig. 4 is a schematic wiring diagram of the circuit of both species of the invention;

Fig. 5 is a cam chart for the apparatus disposed at the loading station;

Fig. 6 is a schematic illustration of the path of travel of the chuck for the species of the invention at the loading station;

Fig. 7 is a cam chart for the species of the invention at the unloading station, and Fig. 8 is a schematic illustration of the path of the chuck for the species of the invention at the unloading station.

The structure of the apparatus for either station is identical in every detail with the exception of the relative positions of certain cams. For this reason the description of the apparatus as shown in Figs. 1, 2 and 3 will serve for both species. The apparatus includes a base plate 10 on which are mounted parallel vertical brackets 11 and 12. Parallel bars 14 extend between the vertical brackets 11 and 12 and have their ends fixedly mounted in apertures of the brackets. A carriage 15 is slidably mounted on the bars 14 and has a groove 16 cut vertically in one face thereof to receive an element 17. The element 17, as shown particularly in Fig. 3, has a lateral portion 18 apertured for a rod 19 which is threaded at both ends. The upper end of the rod 19 has a nut 20 mounted thereon to engage the upper surface of the lateral portion 18 and to also serve as a stop for the upward movement of the element 17. The lower threaded end of the rod 19 is mounted in a threaded aperture 21 of the carriage 15, the upper portion of the aperture 21 being enlarged to house the lower end of a spring 22 which is disposed concentric with the rod 19 and serves to normally urge the element 17 against its variable stop or nut 20. A cover plate 23 mounted on the carriage 15 closes the groove 16 to maintain the element 17 slidably positioned therein. A pin 24 mounted in the lower end 17 serves as a connection between the element and its actuating means.

A rocking member 26, disposed on a spindle 27 having a threaded shank 28 mounted in a threaded aperture of the element 17, is normally urged counter-clockwise, Fig. 2, by a spring 29. The spring 29 is disposed concentric with a portion of the spindle 27, one end of the spring abutting a pin 30 and the other end of the spring connected at 31 to the rocker 26. The rocker 26 supports a roller 32 at one end, this end of the rocker having a cam-like surface 33 and a projecting portion 34. The rocker 26 supports a chuck 35, which is of the electromagnetic type, provided with a cavity 36 to receive terminals 37 of successive articles 38. A stationary cam 38′, adjustably mounted at 39 upon a bracket 40 fixed to the vertical member 12, has a tapered surface 41 and a horizontal surface 42 to control the action of the rocker 26 and the chuck 35. A pin 43 extending laterally from the projection 34 of the rocker 26 is positioned to engage an adjustable stop 44 of the element 17 to control its normal position as shown in dotted lines in Fig. 2.

The schematic diagram shown in Fig. 4 illustrates a source of electrical energy 45 included in a circuit, with a conventional winding of an electromagnet 37 for the chuck 35, which is under the main control of a normally closed switch 46 and a normally open switch 47. The switch 46 is opened by the rocker 26 moving either vertically or horizontally into the starting position as shown in dotted lines in Fig. 2 and also in Fig. 4 The switch 47 is under the control of cam 48 mounted on a cam shaft 49. Due to the fact that switch 46 is opened each time the rocker 26 moves into that position, a relay 146 is used with contacts 147 and 148. When the rocker 26 leaves the starting position, switch 46 is closed energizing relay 146 and closing contacts 147 and 148. Closed contact 147 completes a locking circuit under control of switch 47. Closed contact 148 completes a circuit through electromagnet 37 and switch 47.

The cam shaft 49 is driven intermittently in timed relation with a holder 50 which in the present instance is an eight-unit turret-type holder having grippers positioned at each one of the receiving stations. The grippers of the holder have lower stationary jaws 51 and upper movable jaws 52, the movable jaws being actuated normally to grip the articles 38 and actuated into open position by movement of a plunger 53. The power means for driving the cam shaft 49 in timed relation with the holder 50 includes a vertical shaft 55, having a gear 56 interengaging a gear 57, which is mounted on the cam shaft 49, to drive the cam shaft intermittently complete cycles each of one revolution. The apparatus when at the loading station has a holder 58 in the form of a single track tilted at an angle to direct successive articles to a feeding position in direct alignment with the chuck 35 when moved downwardly from the starting position. At the unloading station, the only change in the holder 58 is its angle of tilt which is downwardly from the receiving position to direct the finished articles away from the receiving position in alignment with the chuck 35. The mechanism for reciprocating the carriage 15 includes a a cam 60, mounted on the cam shaft 49, to actuate a cam follower 61. The cam follower is in the form of a push rod, slidably disposed in a bearing 62, with a roller 63 mounted at one end, the other end provided with a yoke 64 for connection at 65 to a lever 66. One end of the lever 66 is pivotally mounted at 67 upon the base 10 while the other end is connected through an elongated aperture 68 to a pin 69 mounted upon a carriage 15. A spring 70 disposed concentric with the cam follower 61 normally urges the cam follower to the right, Fig. 1, and serves to return the carriage to the starting position. A cam 71 mounted on the cam shaft 49 serves to rock a lever 72 about its pivot 73 to move a bar 74, mounted on one end thereof, against the force of a spring 75 to move an adjustable member or screw 76 upwardly to engage the plunger 53 and open the holder 50, to receive a partially completed article at the load station and to release a completed article at the unloading station. The spring 75 causes a roller 78 mounted on the end of the lever 72 adjacent its cam 71 to follow the contour of the cam.

The contour of cam 48 is such that, at the load station, the chuck will be energized prior to reaching the article on holder 58 and will remain energized until after it transports the article to the holder 50, while at the unload station the cam 48 will cause energization of the chuck prior to reaching the holder 50 and maintain it energized until depositing the completed article on the holder 58.

A cam 80 is formed to rock a lever 81 about its pivot 82 through engagement with a roller 83 and against the force of a spring 84. The roller 83 is a cam follower and is carried by a vertical portion of the lever 81, the free end or horizontal portion of the lever having a yoke 85 adjustably mounted at 86 thereon to straddle the element 17 when the carriage 15 has moved the element into its starting position and located the pin 24 beneath the fingers of the yoke 85. When the cam 80 rocks the lever 81, the element 17 with the chuck will be moved downwardly to cause the chuck in the load station to receive the partially completed article 38 from the holder 58, and at the unload station to deposit the article on the holder 58.

In following the operation of the apparatus for use at the load station, let it be assumed that the carriage 15 is at the starting position shown in dotted lines in Figs. 2 and in solid lines in Fig. 4. The cycle of operation of the cam shaft 49 begins with the holder 50 locating grippers at the receiving station and the holder 58 locating a partially completed article 38 in the feeding position. The cam 80 causes the lever 81 to move the yoke 85 to lower the element 17 against its spring 22, to lower the chuck 35 to pick up the article 38 from the holder 58. As soon as the rocker 26 leaves the starting position, the switch 46 closes and before the chuck 35 reaches the article 38, cam 48 closes switch 47 energizing the chuck and causing it to pick up the partially completed article. The cam 80 will continue its action allowing the element 17 to move vertically back to the starting position after which cam 60 wil cause movement of the carriage to the left. Prior to the carriage reaching the end of its movement to the left, cam 71 operates to open the grippers of the holder 50 to receive the partially completed article. During movement of the carriage to the left, the rocker 26 under the control of the cam surfaces 41 and 42 is moved from a vertical position to a horizontal position to align the article with the holder 50 or the grippers 52 thereof. After reaching the end of its movement to feed the article into the holder 50—52, the cam 48 permits opening of the switch 47 to de-energize the relay 146 and the chuck 35—37 to free the article which is then gripped by the holder 50—52, the cam 71 allowing the grippers of the holder 50—52 to close on the article. Prior to the completion of the one cycle of the cam shaft 49, the carriage 15 is moved to the right to return the rocker 26 with the chuck 35 to its starting position. The general paths of travel of the pivot or spindle 27 for the rocker 26 and chuck 35 are illustrated in Fig. 6 where 90 represents the starting position with respect to the holders 50 and 58. In following the arrows A, B, C and D and studying the cam chart shown in Fig. 5, the actions of cams 48, 60, 71 and 80 may be understood.

After following the operation of the apparatus for action at the load station, its operation at the unload station should be clearly understood by comparing Fig. 8 with Fig. 6 and Fig. 7 with Fig. 5. The actions are substantially identical with the exception of the change in the starting movement of the slide with the chuck 35. At the unload station the chuck is to move, as shown in Fig. 8, from the starting position 90 in the direction of the arrows E, F, G, and H and according to the actions of the cams, as shown in Fig. 7. In this manner, the chuck removes the completed article from the holder 50—52 and positions it on the holder 58, the chuck being energized and de-energized during the proper intervals of time to accomplish this purpose.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for transporting articles singly from one holder to another holder, the holders being located in planes disposed at angles with respect to each other, the apparatus comprising a carriage supported for movement between given limits relative to holders, a chuck, adapted to receive articles singly from either holder and transport the articles singly to the other holder, means to mount the chuck for rocking movement on the carriage, and means actuable to cause movement of the chuck on the carriage to face the respective holders so that an article held by either holder may be received by the chuck and transported thereby to the other holder through assistance of the movement of the carriage.

2. An apparatus for transporting articles singly from one holder to another holder, the holders being located at spaced positions in planes disposed at angles with respect to each other, the apparatus comprising a carriage supported for movement between given limits in a path perpendicular to one of the planes, an element supported by the carriage for movement therewith and movable relative to the carriage between given limits in a path perpendicular to the other plane, a chuck, adapted to receive articles singly from either holder and transport the articles singly to the other holder, mounted for rocking movement on the element, separate means operable in timed relation with each other to move the carriage and element to alternately move the chuck toward the holders, and means actuable alternately to rock the chuck alternately into alignment with the holders prior to the chuck reaching each holder.

3. An apparatus for transporting articles singly from one holder to another holder, the holders being located at spaced positions in planes disposed at angles with respect to each other, the apparatus comprising a carriage supported for movement between given limits in a path perpendicular to one of the planes, an element supported by the carriage for movement therewith and movable relative to the carriage between given limits in a path perpendicular to the other plane, a chuck, adapted to receive articles singly from either holder and transport the articles singly to the other holder, mounted for rocking movement on the element, separate means operable in timed relation with each other to move the carriage and element to alternately move the chuck toward the holders, means actuable alternately to rock the chuck alternately into alignment with the holders prior to the chuck reaching each holder, the chuck being of the electromagnetic type, means actuable to cause energization of the chuck after receiving an article from one holder, and means actuable to de-energize the chuck after transporting the article to the other holder.

4. An apparatus for transporting articles singly from one holder to another holder, one holder being disposed in a given plane and adapted to advance articles singly to a feeding station, the other holder being disposed in a plane at an angle with respect to other plane and adapted to receive articles singly at a loading station, the apparatus comprising a carriage supported for movement between given limits in a path perpendicular to one of the planes, an element supported by the carriage for movement therewith and movable relative to the carriage between given limits in a path perpendicular to the other plane, a chuck, adapted to receive articles singly from either holder and transport the articles singly to the other holder, mounted for rocking movement on the element, separate means operable in timed relation with each other to move the carriage and element to alternately move the chuck toward the holders, and means actuable alternately to rock the chuck alternately into alignment with the holders prior to the chuck reaching each holder.

5. An apparatus for transporting articles singly from one holder to another holder, one holder being disposed in a given plane and adapted to advance articles singly to a feeding station, the other holder being disposed in a plane at an angle with respect to other plane and adapted to receive articles singly at a loading station, the apparatus comprising a carriage supported for movement between given limits in a path perpendicular to one of the planes, an element supported by the carriage for movement therewith and movable relative to the carriage between given limits in a path perpendicular to the other plane, a chuck, adapted to receive articles singly from either holder and transport the articles singly to the other holder, mounted for rocking movement on the element, separate means operable in timed relation with each other to move the carriage and element to alternately move the chuck toward the holders, means actuable alternately to rock the chuck alternately into alignment with the holders prior to the chuck reaching each holder, the chuck being of the electromagnetic type, means actuable to cause energization of the chuck after receiving an article from one holder, and means actuable to de-energize the chuck after transporting the article to the other holder.

6. An apparatus for transporting articles singly from one holder to another holder, one holder being disposed in a given plane and adapted to advance articles singly to an unloading station, the other holder being disposed in a plane at an angle to the other plane and adapted to receive articles singly and advance them away from a depositing position the apparatus comprising a carriage supported for movement between given limits in a path perpendicular to one of the planes, an element supported by the carriage for movement therewith and movable relative to the carriage between given limits in a path perpendicular to the other plane, a chuck, adapted to receive articles singly from either holder and transport the articles singly to the other holder, mounted for rocking movement on the element, separate means operable in timed relation with each other to move the carriage and element to alternately move the chuck toward the holders, and means actuable alternately to rock the chuck alternately into alignment with the holders prior to the chuck reaching each holder.

7. An apparatus for transporting articles singly from one holder to another holder, one holder being disposed in a given plane and adapted to advance articles singly to an unloading station, the other holder being disposed in a plane at an angle to the other plane and adapted to receive articles singly and advance them away from a depositing position the apparatus comprising a carriage supported for movement between given limits in a path perpendicular to one of the planes, an element supported by the carriage for movement therewith and movable relative to the carriage between given limits in a path perpendicular to the other plane, a chuck, adapted to receive articles singly from either holder and transport the articles singly to the other holder, mounted for rocking movement on the element, separate means operable in timed relation with each other to move the carriage and element to alternately move the chuck toward the holders, means actuable alternately to rock the chuck alternately into alignment with the holders prior to the chuck reaching each holder, the chuck being of the electromagnetic type, means actuable to cause energization of the chuck after receiving an article from one holder, and means actuable to de-energize the chuck after transporting the article to the other holder.

References Cited in the file of this patent

UNITED STATES PATENTS

| | | |
|---|---|---|
| 1,837,607 | Biggert | Dec. 22, 1931 |
| 1,846,866 | Hauk | Feb. 23, 1932 |
| 2,073,945 | Risser | Mar. 16, 1937 |
| 2,837,199 | Ladewig | June 3, 1958 |